United States Patent
Kim (10) Patent No.: US 8,033,356 B2
(45) Date of Patent: Oct. 11, 2011

(54) EXTERNAL AIRBAG SYSTEM OF VEHICLE

(75) Inventor: Yong Sun Kim, Namyangju-si (KR)

(73) Assignees: Kia Motors Corporation, Seoul (KR); Hyundai Motor Company, Seoul (KR)

( * ) Notice: Subject to any disclaimer, the term of this patent is extended or adjusted under 35 U.S.C. 154(b) by 227 days.

(21) Appl. No.: 12/325,860

(22) Filed: Dec. 1, 2008

(65) Prior Publication Data

US 2009/0152041 A1    Jun. 18, 2009

(30) Foreign Application Priority Data

Dec. 13, 2007 (KR) .................. 10-2007-0130040
Nov. 7, 2008 (KR) .................. 10-2008-0110237

(51) Int. Cl.
*B60R 21/00* (2006.01)
*B60R 19/18* (2006.01)

(52) U.S. Cl. .......... 180/271; 180/274; 296/187.04; 296/187.06; 293/108

(58) Field of Classification Search .......... 180/271, 180/274; 296/187.04, 187.06, 187.09; 293/107, 293/108, 134
See application file for complete search history.

(56) References Cited

U.S. PATENT DOCUMENTS

| 5,725,265 | A | 3/1998 | Baber |
| 7,258,191 | B1* | 8/2007 | Rammer ............ 180/274 |
| 7,806,221 | B2* | 10/2010 | Mishra ............ 180/274 |
| 7,836,996 | B2* | 11/2010 | Kitte et al. ............ 180/271 |
| 2004/0074688 | A1 | 4/2004 | Hashimoto et al. |
| 2009/0289471 | A1* | 11/2009 | Finney ............ 296/187.04 |

FOREIGN PATENT DOCUMENTS

| JP | 2001-315599 | | 11/2001 |
| JP | 2005-186885 | | 7/2005 |
| JP | 2006-240351 | A | 9/2006 |
| KR | 10-2004-0088200 | A | 10/2004 |

* cited by examiner

*Primary Examiner* — Paul N. Dickson
*Assistant Examiner* — Joselynn Y. Sliteris
(74) *Attorney, Agent, or Firm* — Morgan, Lewis & Bockius LLP (57) ABSTRACT

An external airbag system of a vehicle may include an airbag housing that is disposed behind a bumper of the vehicle and is allowed to slide straight in a forward direction, an airbag cushion that is disposed inside the airbag housing, a sliding device that moves the airbag housing in a forward direction, and an airbag controller that controls the airbag cushion and the sliding device according to information of sensing device.

12 Claims, 9 Drawing Sheets

EXTERNAL AIRBAG SYSTEM OF VEHICLE

CROSS-REFERENCE TO RELATED APPLICATION

The present application claims priority to Korean Application Numbers 10-2007-0130040 and 10-2008-0110237, filed Dec. 13, 2007 and Nov. 7, 2008 respectively, the entire contents of which application is incorporated herein for all purposes by this reference.

BACKGROUND OF THE INVENTION

1. Field of the Invention

The present invention relates to an airbag system for a car accident, particularly a technology about an airbag system in which an airbag cushion expands outside from the front of a vehicle to absorb impact in a car accident.

2. Description of Related Art

Airbag systems are mounted inside vehicles in the related art, such that when impact is applied to the car body, the impact is sensed and an airbag cushion absorbs the impact that is applied to a passenger, expanding in the vehicle.

However, because the airbag system mounted inside a vehicle as described above basically operates after impact is applied to the car body, it is frequently difficult to secure sufficient time to expand the airbag cushion in order to protect the passenger.

Therefore, by providing an airbag system that allows an airbag cushion to expand at the front of a vehicle before a vehicle collision, it is possible to secure sufficient time to protect a passenger and reduce damage to the passenger due to the structure increasing a marginal space for absorbing shock energy.

Figure 1:
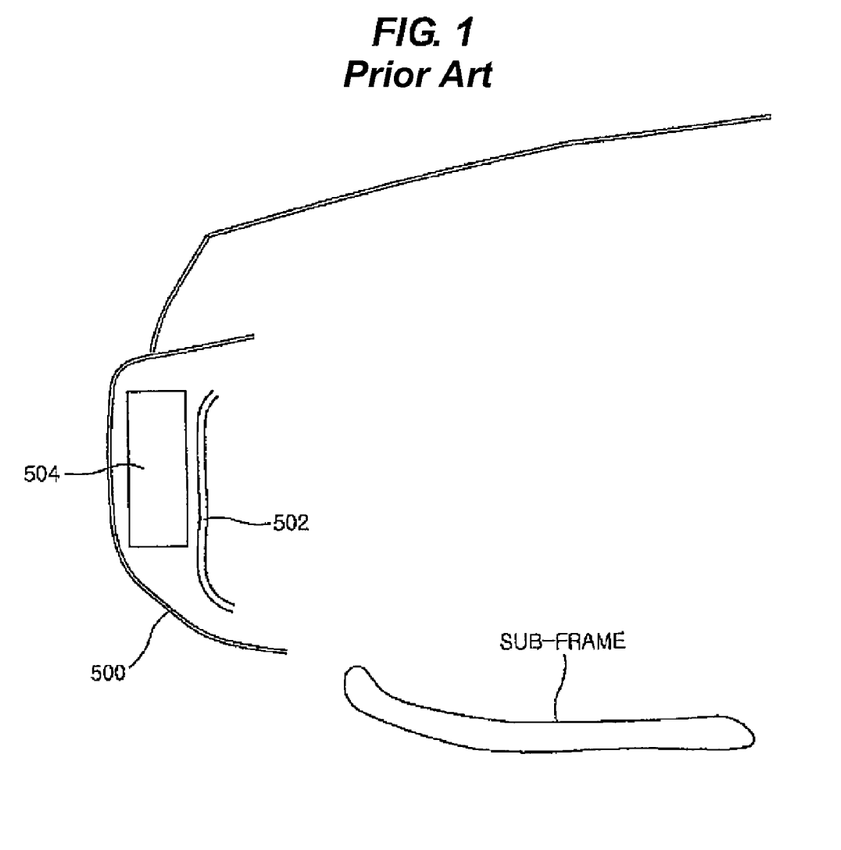
FIG. 1 is a view showing an external airbag system of a conventional vehicle.

FIG. 1 shows an outside airbag system of a vehicle that allows an airbag expands from the front of the vehicle to achieve the above objects in the related art, in which an airbag cushion 504 is disposed in front of a bumper back beam 502 inside a front bumper 500 of the vehicle.

But, airbag cushion 504 disposed inside the bumper of a vehicle as described above has not been put to practical use, because it is difficult to make the original function of the bumper itself in the related art.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide for an external airbag system of a vehicle that can considerably improve safety of the vehicle, in addition to sufficiently achieving the original function of the front bumper of the vehicle as in the related art, by expanding an airbag cushion at the front of the vehicle before a vehicle collision in a front collision to secure sufficient time and space to absorb the impact.

One aspect of the present invention is directed to an external airbag system of a vehicle which may include an airbag housing disposed behind a bumper of the vehicle and disengagably connected to a stationary member of the vehicle, an airbag cushion that is disposed inside the airbag housing, a sliding device that moves the airbag housing in a forward direction of the vehicle, and/or an airbag controller that activates an inflator of the airbag cushion and the sliding device according to information of sensing device, wherein the airbag housing is allowed to slide in the forward direction by the sliding device.

In another aspect of the present invention, the external airbag system may further include a holding device that connects the airbag housing and the stationary member and disconnects the airbag housing and the stationary member by the airbag controller according to the information of the sensing device.

The sliding device may include a slide rail attached to a side of the airbag housing, a guide rail fixed to an upper bracket attached to the stationary member and slidably receiving the slide rail therein to guide the airbag housing in the forward direction of the vehicle, and/or a pretensioner fixed to the upper bracket and activating the airbag housing by a connecting member, wherein the connecting member engages the pretensioner with the airbag housing. The stationary member may be a sub-frame attached to the vehicle. The pretensioner may be an extension spring to bias the airbag housing in the forward direction in a normal condition. The connecting member may be a wire. Movement direction of the connecting member may be changed by a direction converter so that activation direction of the pretensioner and movement direction of the airbag housing is reverse each other. Anti-pushing plate may be provided that elastically protrudes upward from a surface of the airbag housing and prevents the airbag housing from being pushed backwards once sliding in the forward direction. The upper bracket may include anti-pushing hole that locks anti-pushing plate therein to prevent the airbag housing from being pushed in a rearward direction of the vehicle once the airbag housing slides in the forward direction. The upper bracket may include a protrusion protruding toward the anti-pushing plate to prevent the airbag housing from being pushed in a reward direction of the vehicle once the airbag housing slides in the forward direction.

In another aspect of the present invention, at least two airbag housings may be disposed in a traverse direction, at the front of the vehicle, the airbag cushions of the airbag housings partially overlap each other while expanding, and the airbag controller sequentially expands the airbag cushions.

The sensing device may include a radar sensor that detects an obstacle in front of the vehicle, a camera sensor that detects shape of an obstacle in front of the vehicle, and/or a sensor control unit that is connected to the airbag controller to provide the information received from the radar sensor and the camera sensor.

In further another aspect of the present invention, an external airbag system of a vehicle may include an airbag housing connected to a stationary member, which is positioned at front lower portion of the vehicle, to be positioned at rear lower portion of a bumper at a front portion of the vehicle, an airbag cushion disposed in the airbag housing, an inflator disposed at rear portion inside the airbag housing to supply inflation gas into the airbag cushion, and/or an airbag controller controlling operation of the inflator. The stationary member may be a sub-frame attached to the vehicle The stationary member may have a housing attachment portion bending upwards from a portion of the front portion of the vehicle and recessed such that the airbag housing is inserted and fixed therein. A guide member may be provided that guides expanding direction of the air cushion in order that the airbag cushion is not blocked by the lower edge of bumper, is provided between the airbag housing and the bumper such that the airbag cushion can expand without being blocked by the bumper.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
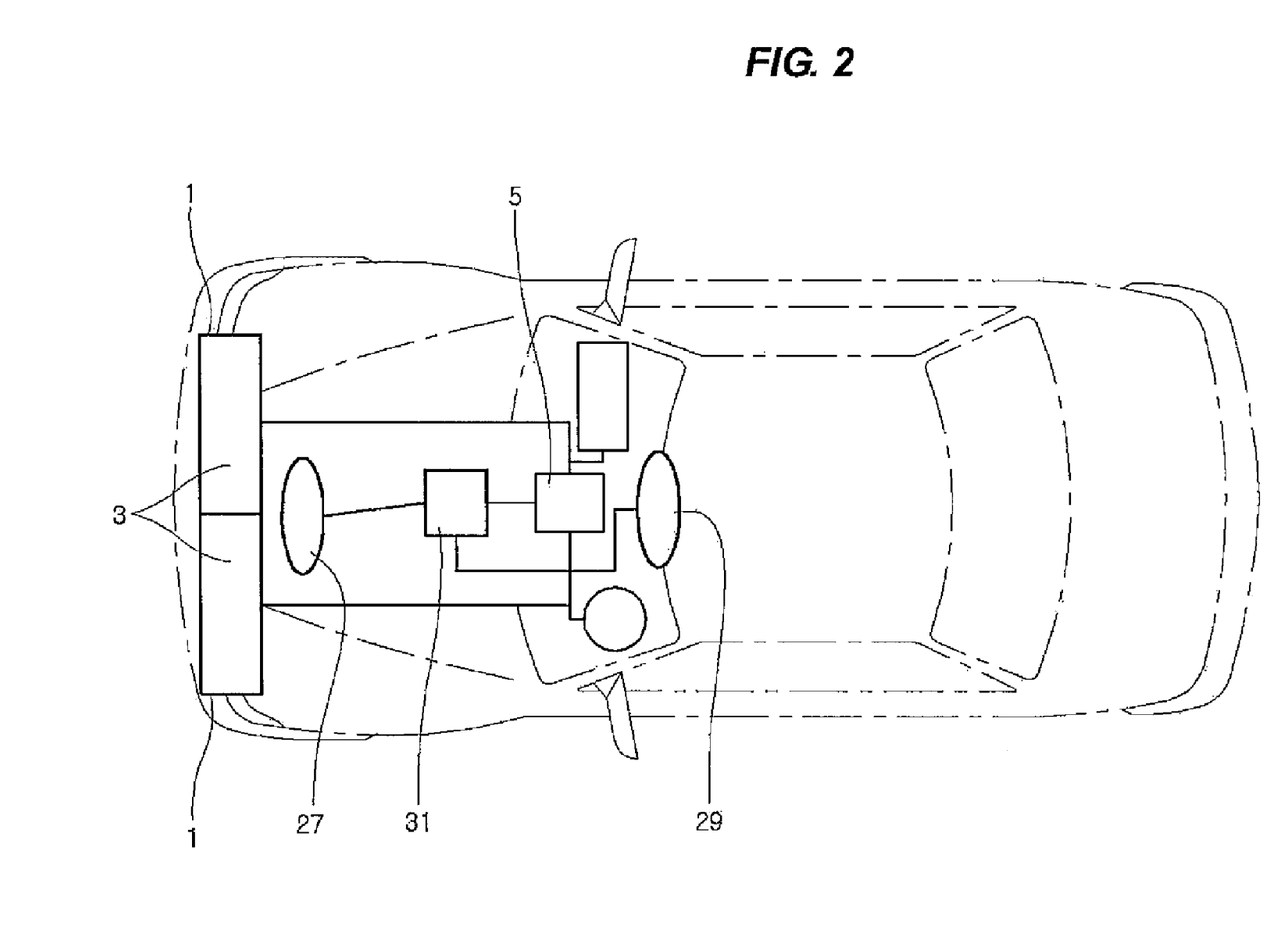
FIG. 2 is a view showing an exemplary external airbag system of a vehicle according to the present invention.
Figure 3:
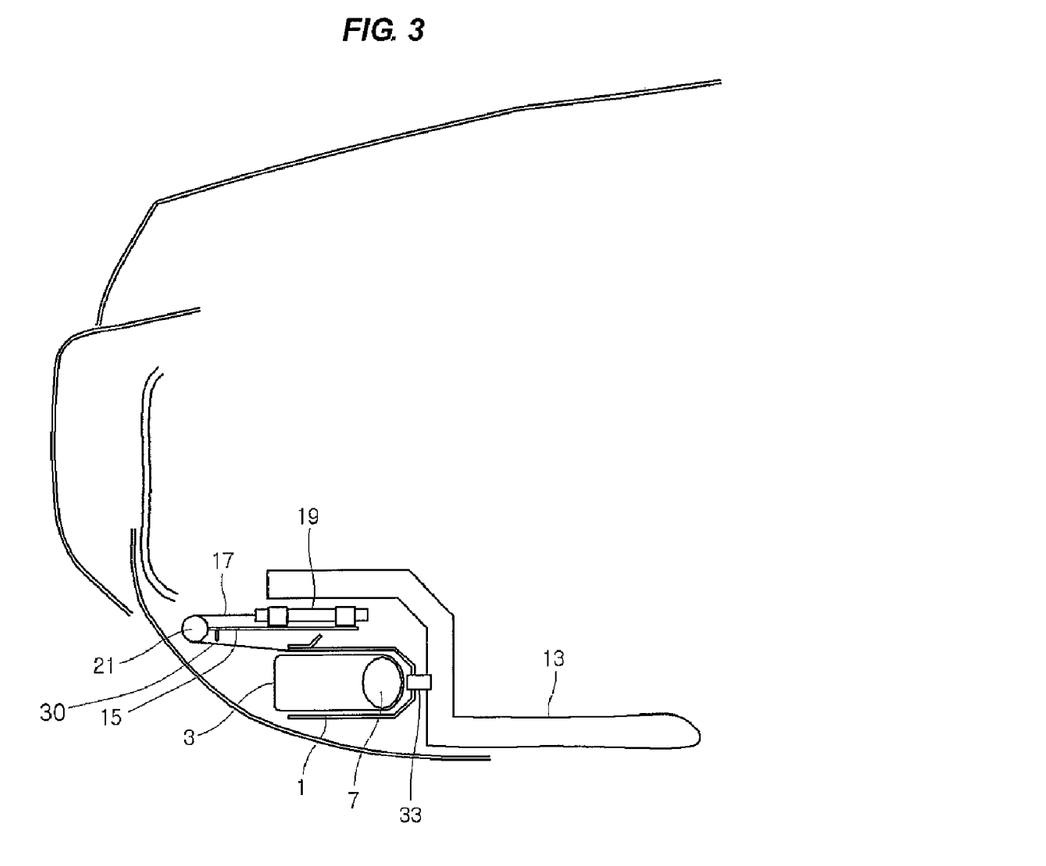
FIG. 3 is a view showing an exemplary external airbag system of a vehicle according to the present invention, in which an airbag housing has been mounted.
Figure 4:
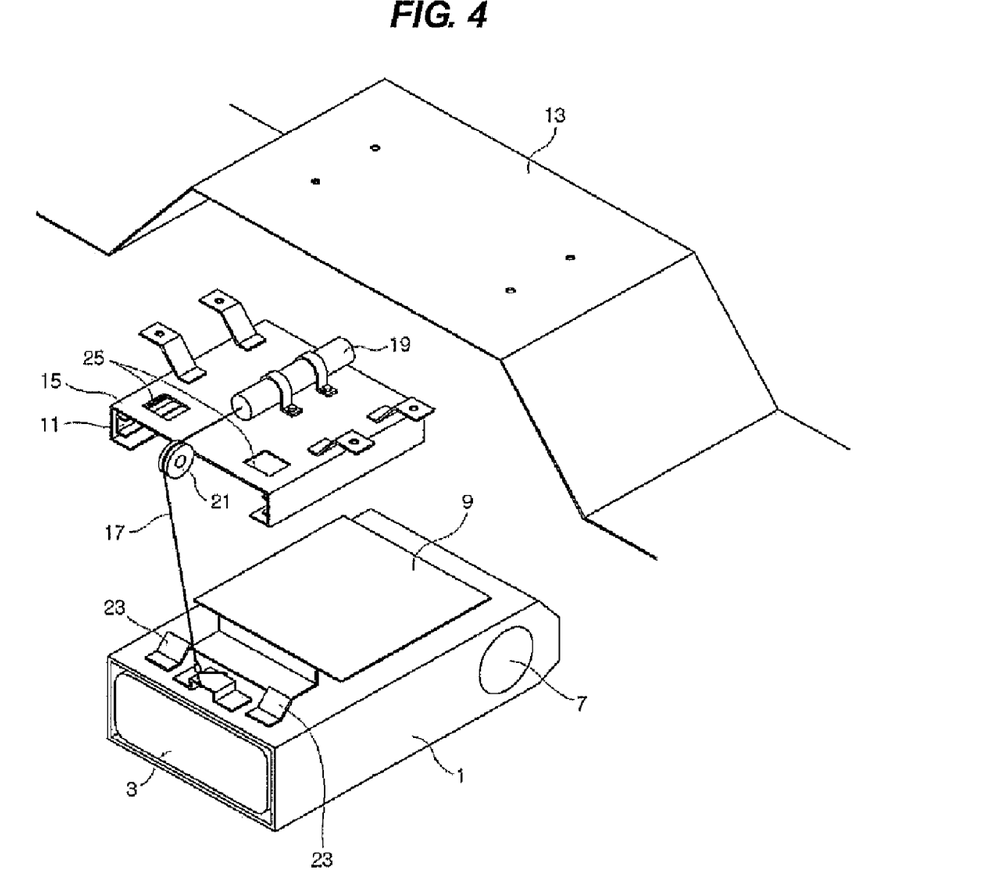
FIG. 4 is an exploded perspective view of parts shown in FIG. 3.

Referring to FIGS. 2 to 4, an external airbag system of a vehicle according to an embodiment of the invention includes: an airbag housing 1 that is disposed behind the front bumper of the vehicle and is allowed to slide straight in a forward direction at the front of the vehicle; an airbag cushion 3 that is disposed inside airbag housing 1; a sliding device that moves airbag housing 1 in a forward direction at the front of the vehicle; and an airbag controller 5 that controls airbag cushion 3 and the sliding device.

An inflator 7 is disposed at the rear portion inside airbag housing 1 and a slide rail 9 is disposed over airbag housing 1. A guide rail 11 that guides slide rail 9 inserted therein to slide in a forward or rearward direction of the vehicle is provided. Guide rail 11 is attached to an upper bracket 15 that is fixed to a sub-frame 13 of the vehicle. A pretensioner 19, a part of the sliding device, is fixed to upper bracket 15 to be biased to pull airbag housing 1 by using a wire 17 to slide airbag housing 1 in a forward direction at the front of the vehicle.

In an exemplary embodiment of the present invention, for the pretensioner 19 to provide an elastic force to wire 17 inside, the sliding device may include a holding device that holds airbag housing 1 and releases airbag housing 1 under control of airbag controller 5, such as ratchet, pin, lever, solenoid, or actuator.

In another exemplary embodiment of the present invention, pretensioner 19 may be an actuator that does not pull wire 17 by itself in a normal state, but instantaneously pulls wire 17 in response to an order of airbag controller 5.

Further, the sliding device may be provided with a detonating device similar to the inflator to generate explosion pressure that is needed to instantaneously move airbag housing 1 in a forward direction at the front of the vehicle, in response to an order of airbag controller 5.

In addition, a pretension spring that elastically supports the rear of airbag housing 1 in a forward direction at the front of the vehicle may be used for the sliding device, in which a holding device may be needed to prevent airbag housing from being moved in a forward direction at the front of the vehicle by the pretension spring in a normal condition as described above.

In this embodiment, as described above, the sliding device includes pretensioner 19 that pulls wire 17 in a rearward direction by itself using an elastic force and a holding device 33 that holds airbag housing 1 that is pulled through wire 17, and in FIG. 3, holding device 33, fixed between airbag housing 1 and sub-frame 13, fixes airbag housing 1 to sub-frame 13 in a normal condition and can release airbag housing 1 by control of airbag controller 5.

Wire 17 is wound around a direction converter such as a wire roller 21 fastened to front portion of upper bracket 15 to change the pulling direction of the wire.

Airbag housing 1 has anti-pushing plates 23 that is elastically-biased upwards. The anti-pushing plates 23 protrude upward to prevent airbag housing 1 from being pushed back once sliding out from upper bracket 15 in a forward direction at the front of the vehicle. Further, upper bracket 15 correspondingly has anti-pushing holes 25 that lock anti-pushing plates 23 to prevent airbag housing 1 from being pushed back toward the rear of the vehicle.

Figure 6:
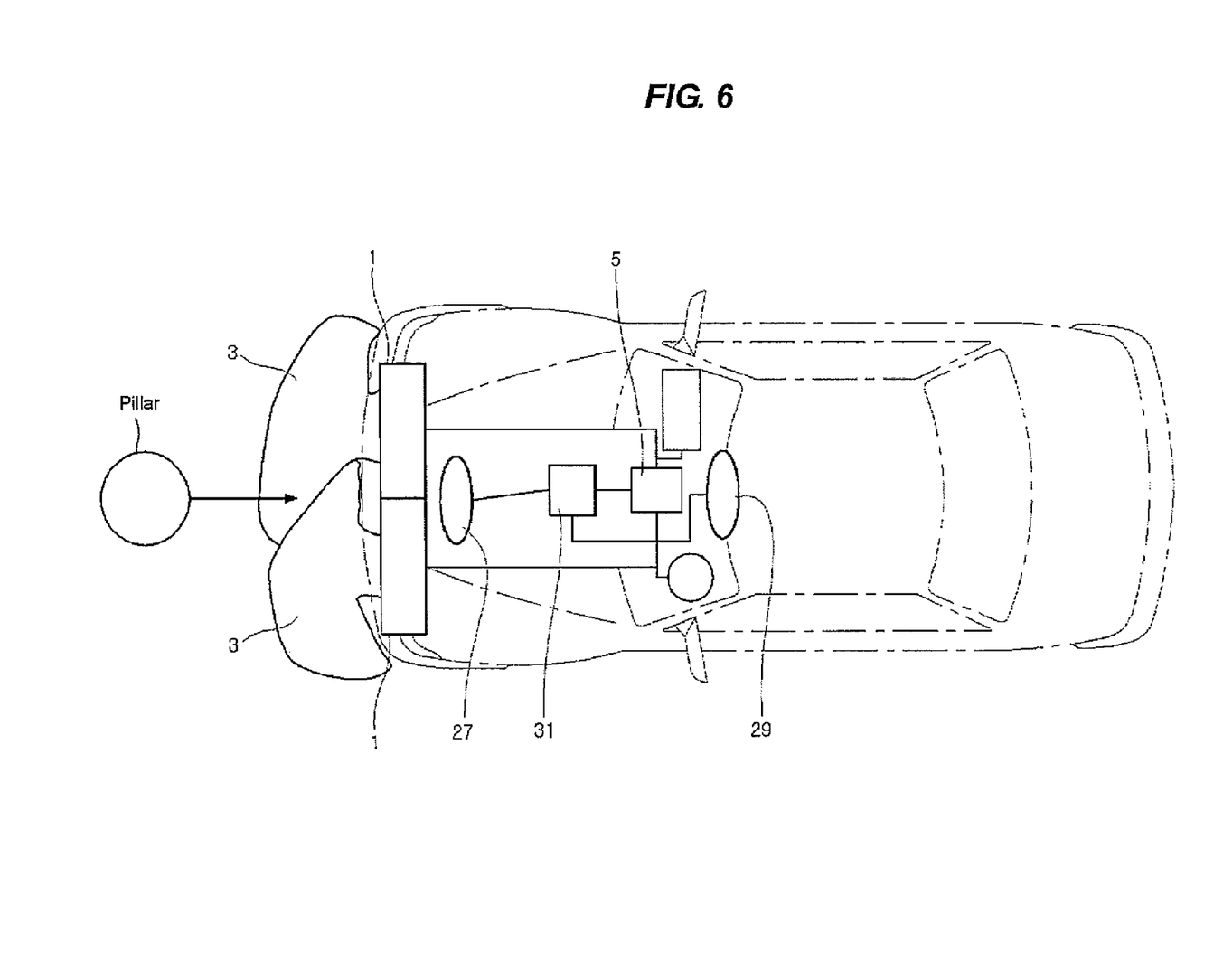
FIG. 6 is a view illustrating the operation of an exemplary external airbag system of a vehicle according to the present invention, seen from above the vehicle.

As shown in FIG. 6, at least two airbag housings 1 are disposed in the traverse direction of the vehicle such that airbag cushions 3 of airbag housings 1 partially overlap each other while expanding, and airbag controller 5 sequentially expands airbag cushions 3.

According to this configuration, when the front of the vehicle collides with an object such as a pillar, airbag cushions 3 that are displaced with a predetermined distance absorb the impact, overlapping each other and thereby improving shock-absorbing performance.

On the other hand, a device that can detect an object in front of the vehicle is required to actuate holding device 33 and inflator 7 as described above before the vehicle collides with an object in the front area.

In this embodiment, as shown in FIG. 2, the airbag system further includes a radar sensor 27 that can detect an obstacle in front of the vehicle, a camera sensor 29 that can detect the shape of an obstacle in front of the vehicle, and a sensor control unit 31 that is connected to airbag controller 5 to control radar sensor 27 and camera sensor 29.

Alternatively, other various sensors, such as ultrasonic sensors or infrared sensors, may be used to perform the same functions as the above-mentioned parts.

In this embodiment, relative distance and relative speed to an obstacle in the front area of the vehicle, and the shape of the obstacle, etc. are determined in advance by radar sensor 27 and camera sensor 29, and then airbag controller 5 actuates inflator 7 and holding device 33.

Figure 5:
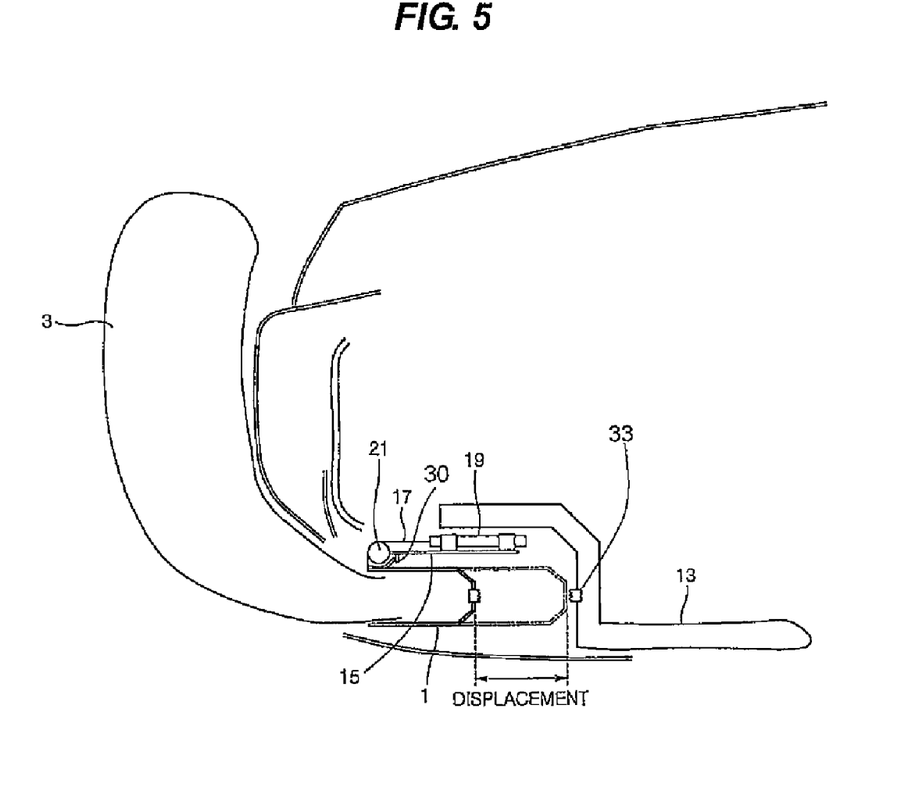
FIG. 5 is a view illustrating the operation of an exemplary external airbag system of a vehicle according to the present invention, as compared with FIG. 3.

FIG. 5 shows airbag cushion 3 expanding after the conditions at the front area of the vehicle are detected in advance as described above. Referring to FIG. 5, airbag controller 5 receives information collected from radar sensor 27 and camera sensor 29 through sensor control unit 31, determines whether to actuate the airbag and the timing, and then actuate holding device 33 to disconnect the airbag housing 1 from the sub-frame 13 at first.

Accordingly, when the airbag housing 13 is disconnected from the sub-frame 13, the airbag housing 1 is moved in a forward direction at the front of the vehicle by the restoring force of the pretensioner 19 applied through wire 17, and once having been moved in a forward direction at the front of the vehicle, airbag housing 1 cannot move back by anti-pushing plates 23 and anti-pushing holes 25.

In another exemplary embodiment of the present invention, the upper bracket 15 may include a protrusion 30 protruding downwards instead of the anti-pushing holes 25 as shown in FIGS. 3 and 5. Accordingly, once having been moved in a forward direction at the front of the vehicle, airbag housing 1 cannot move back by the protrusion 30 and anti-pushing plates 23 since the protrusion 30 blocks rear movement of the airbag housing 1.

The airbag housing 1 moves in a forward direction at the front of the vehicle before airbag cushion 3 expands because airbag cushion 3 is blocked by the lower side of the bumper and cannot freely expand, if airbag cushion expands inside airbag housing 1 that has not moved in a forward direction at the front of the vehicle.

Further, the airbag housing 1 is held at the lower portion behind the bumper with holding device 33 in a normal condition since it may spoil the appearance of the vehicle and may be broken by hitting against elevated places on the road when the vehicle is in travel, if airbag housing 1 is positioned right under the bumper.

As described above, after airbag housing 1 moves in a forward direction at the front of the vehicle and airbag cushion 3 expands without being blocked by the bumper, inflator 7 is actuated to expand airbag cushion 3. When two airbag cushions 3 expand as described above, airbag cushions 3 can considerably absorb the impact due to collision with an object by overlapping each other.

When airbag cushion 3 expands by inflator 7, airbag housing 1 is held by anti-pushing plates 23 and anti-pushing holes 25 or protrusion 30, thereby allowing airbag cushion 3 to freely expand forwards.

Figure 7:
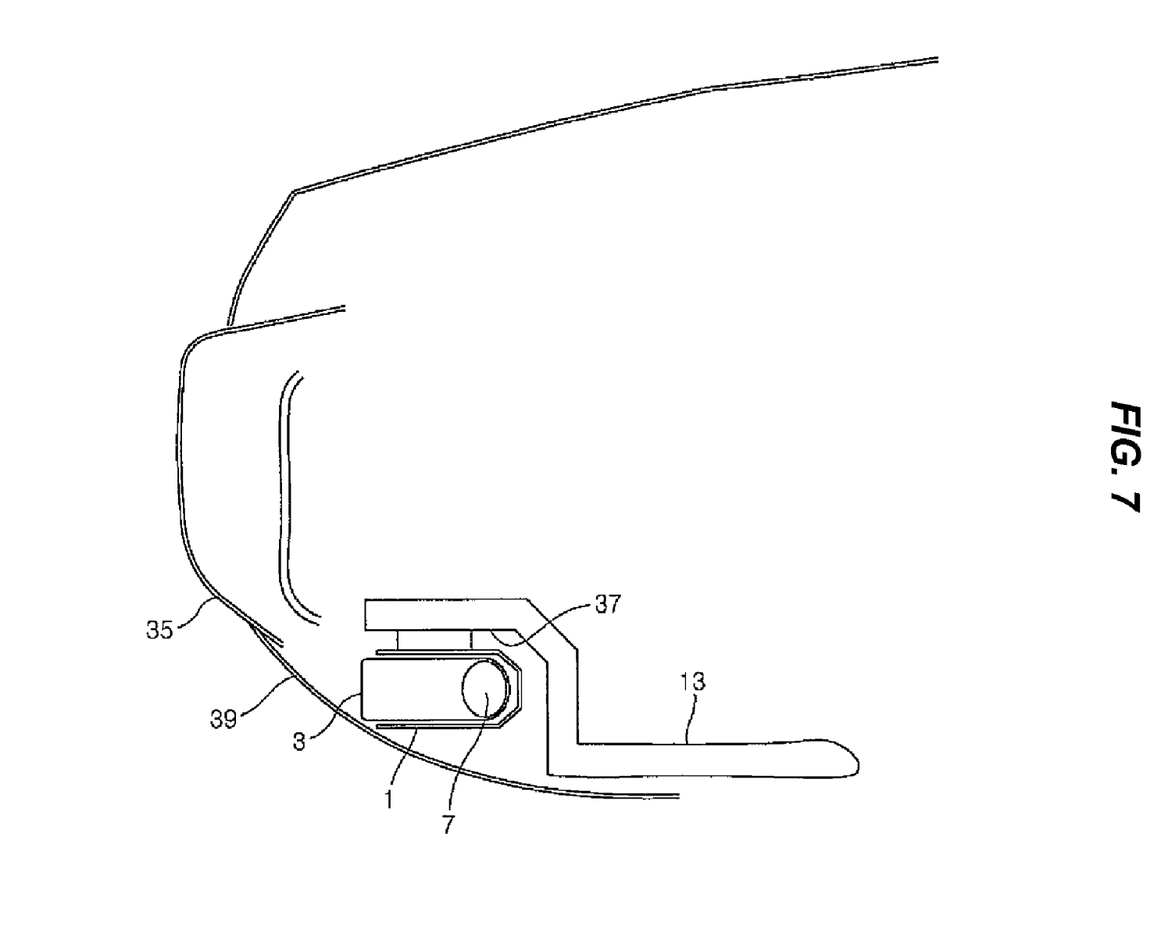
FIG. 7 is a view showing another an exemplary external airbag system according to the invention.
Figure 8:
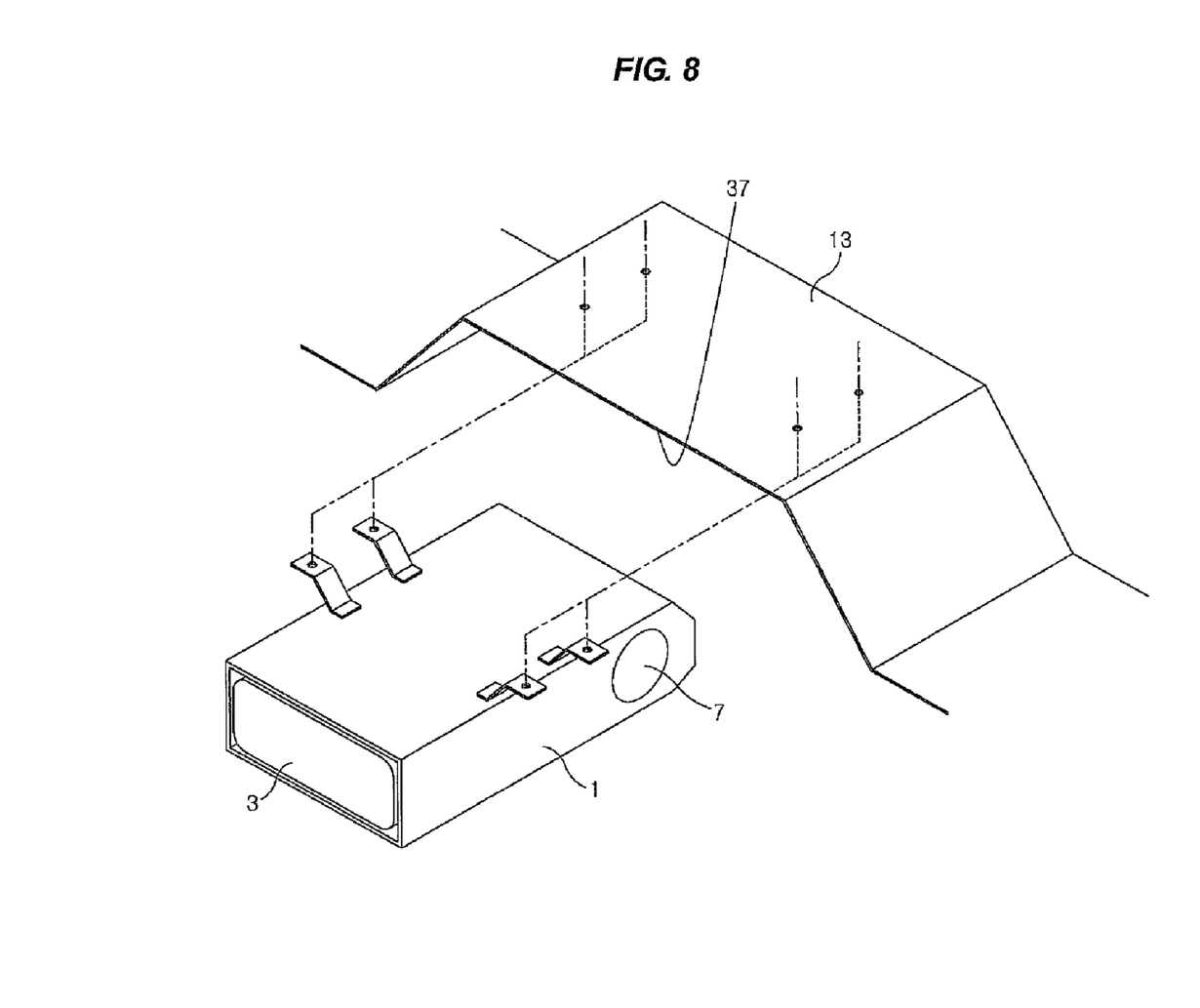
FIG. 8 is a view three-dimensionally showing exemplary components of an external airbag system according to the present invention.
Figure 9:
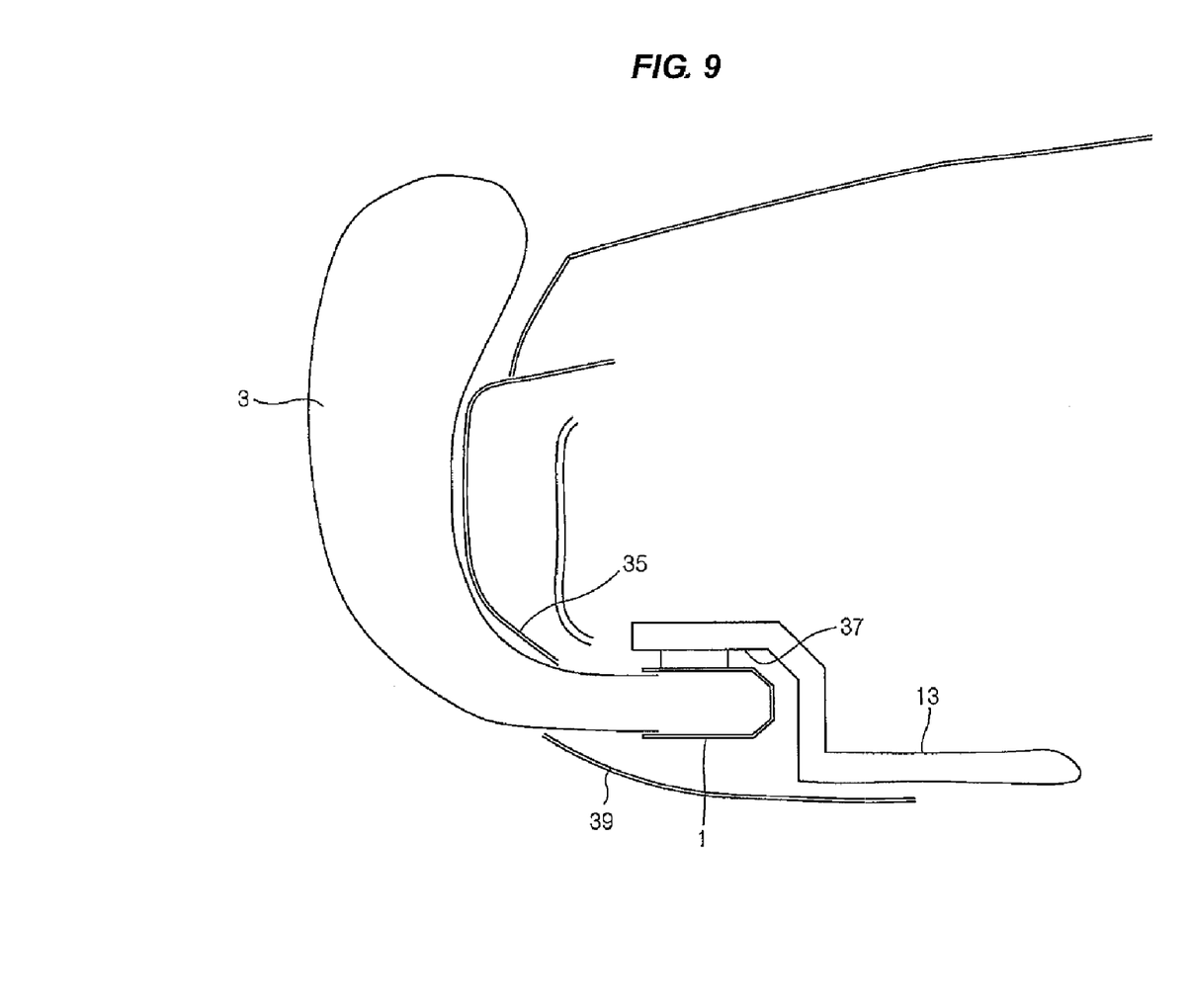
FIG. 9 is a view illustrating a operation of an external airbag system according to the present invention, as compared with FIG. 7.

Referring FIGS. 7 to 9, an external airbag system of a vehicle according to another embodiment of the invention, referring to FIGS. 7 to 9, includes: an airbag housing 1 connected to a sub-frame 13, which is positioned at the front lower portion of the vehicle, to be positioned at the rear lower portion of a bumper 35 at the front portion of the vehicle; an airbag cushion 3 disposed in airbag housing 1; an inflator 7 disposed at the rear portion inside airbag housing 1 to supply inflation gas into airbag cushion 3; and an airbag controller 5 controlling the operation of inflator 7.

Sub-frame 13 has a housing attachment portion 37 bending up from a portion of the front portion of the vehicle and recessed such that airbag housing 1 is received, and airbag housing 1 is inserted in housing attachment portion 37 and fixed therein.

That is, airbag housing 1 is moved to the front portion of the vehicle by the sliding device in the above embodiment, but in this embodiment, airbag housing 1 is already fixed to the front portion of the vehicle, such that this embodiment has an advantage of being manufactured at lower cost than the above embodiment.

In order to prevent that airbag cushion 3 is blocked by the lower portion of bumper 35 and does not smoothly expands as described above, the position of airbag housing 1 is appropriately determined by checking the expanding paths of airbag cushion 3 through several tests. Alternatively, a guide member that guides the expanding direction in order that airbag cushion 3 is not blocked by the lower edge of bumper 35 may be provided between airbag housing 1 and bumper 35 such that airbag cushion 3 expanding can smoothly expand without being blocked by bumper 35.

As shown in the figure, a protection cover 39 surrounding airbag housing 1 from the lower portion of bumper 35 extending to the lower portion of the vehicle is provided external to airbag housing 1 to prevent damage to airbag housing 1 and protect the external appearance of the vehicle.

Similar to the above embodiment, in this embodiment, at least two airbag housings 1 are disposed in the transverse direction of the vehicle, airbag cushions 3 of airbag housings 1 are disposed to overlap each other when expanding, and airbag controller 5 may be configured to sequentially expand airbag cushions 3.

That is, the configuration shown in FIG. 6 can be applied to this embodiment.

Further, the external airbag system of this embodiment, similar to the above embodiment, also includes a radar sensor 27 that detects obstacles at the front area of the vehicle, a camera sensor 29 that detects the shapes of obstacles at the front area of the vehicle, and a sensor control unit 31 that controls radar sensor 27 and camera sensor 29 and is connected to airbag controller 5. Airbag controller 5 receives information, which is collected from radar sensor 27 and camera sensor 29, from sensor control unit 31, determines whether or not to actuate the airbag and the actuating time, and then actuates inflator 7 to expand airbag cushion 3.

Similar to the above embodiment, it is possible to maximize the shock-absorbing effect by sequentially expanding two airbag cushions 3 in this embodiment such that airbag cushions 3 overlap each other when the vehicle collides with a pillar etc.

According to various aspects of the external airbag system of a vehicle in the present invention, it is possible to considerably improve safety of the vehicle, in addition to sufficiently achieving the original function of the front bumper of the vehicle as in the related art, by expanding an airbag cushion at the front of the vehicle before a vehicle collision in a front collision to secure sufficient time and space to absorb the impact.

For convenience in explanation and accurate definition in the appended claims, the terms "upper" or "lower", "front" or "rear", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An external airbag system of a vehicle comprising:
an airbag housing disposed behind a bumper of the vehicle and connected to a stationary member of the vehicle;
an airbag cushion that is disposed inside the airbag housing;
a sliding device that moves the airbag housing in a forward direction of the vehicle; and
an airbag controller that activates an inflator of the airbag cushion and the sliding device according to information of sensing device, wherein the airbag housing is allowed to slide in the forward direction by the sliding device;
wherein the sliding device comprises:
a slide rail attached to a side of the airbag housing;
a guide rail fixed to an upper bracket attached to the stationary member and slidably receiving the slide rail therein to guide the airbag housing in the forward direction of the vehicle; and
a pretensioner fixed to the upper bracket and activating the airbag housing by a connecting member, wherein the connecting member engages the pretensioner with the airbag housing.

2. The external airbag system as defined in claim 1, further comprising a holding device that connects the airbag housing and the stationary member and disconnects the airbag housing and the stationary member according to the airbag controller.

3. The external airbag system as defined in claim 1, wherein the stationary member is a sub-frame attached to the vehicle.

4. The external airbag system as defined in claim 1, wherein the pretensioner is an extension spring to bias the airbag housing in the forward direction in a normal condition.

5. The external airbag system as defined in claim 1, wherein movement direction of the connecting member is changed by a direction converter so that activation direction of the pretensioner and movement direction of the airbag housing is reverse of each other.

6. The external airbag system as defined in claim 1, further comprising anti-pushing plate that elastically protrudes upwardly from a surface of the airbag housing and prevents the airbag housing from being pushed backwards once sliding in the forward direction.

7. The external airbag system as defined in claim 6, wherein the upper bracket includes anti-pushing hole that locks anti-pushing plate therein to prevent the airbag housing from being pushed backwards.

8. The external airbag system as defined in claim 7, wherein the upper bracket includes a protrusion protruding toward the anti-pushing plate and locking the anti-pushing plate to prevent the airbag housing from being pushed backwards once the airbag housing slides in the forward direction.

9. The external airbag system as defined in claim 1, wherein at least two airbag housings are disposed in a traverse direction, in front of the vehicle, the airbag cushions of the airbag housings partially overlap each other while expanding, and the airbag controller sequentially expands the airbag cushions.

10. An external airbag system of a vehicle comprising:
an airbag housing disposed behind a bumper of the vehicle and connected to a stationary member of the vehicle;
an airbag cushion that is disposed inside the airbag housing;
a sliding device that moves the airbag housing in a forward direction of the vehicle;
a radar sensor that detects an obstacle in front of the vehicle;
a camera sensor that detects shape of an obstacle in front of the vehicle; and
a sensor control unit that is connected to an airbag controller to provide information received from the radar sensor and the camera sensor;
wherein the sliding device comprises:
a slide rail attached to a side of the airbag housing;
a guide rail fixed to an upper bracket attached to the stationary member and slidably receiving the slide rail therein to guide the airbag housing in the forward direction of the vehicle; and
a pretensioner fixed to the upper bracket and activating the airbag housing by a connecting member, wherein the connecting member engages the pretensioner with the airbag housing.

11. The external airbag system as defined in claim 10, wherein the airbag controller activates an inflator of the airbag cushion and the sliding device according to information of the sensor control unit.

12. The external airbag system as defined in claim 10, further comprising anti-pushing plate that elastically protrudes upwardly from a surface of the airbag housing and prevents the airbag housing from being pushed backwards once sliding in the forward direction.

* * * * *